(12) United States Patent
Schiesser

(10) Patent No.: US 10,972,444 B1
(45) Date of Patent: Apr. 6, 2021

(54) MAPPING ACCOUNT INFORMATION

(71) Applicant: Amazon Technologies, Inc., Reno, NV (US)

(72) Inventor: Steven Eric Schiesser, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 337 days.

(21) Appl. No.: 15/490,747

(22) Filed: Apr. 18, 2017

(51) Int. Cl.
| | |
|---|---|
| *H04L 29/06* | (2006.01) |
| *G06F 9/50* | (2006.01) |
| *G06F 16/9535* | (2019.01) |
| *H04L 9/32* | (2006.01) |

(52) U.S. Cl.
CPC ............ *H04L 63/06* (2013.01); *G06F 9/5038* (2013.01); *G06F 16/9535* (2019.01); *H04L 9/32* (2013.01); *H04L 63/083* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 7,117,528 | B1 * | 10/2006 | Hyman | H04L 63/08 726/5 |
| 7,788,497 | B2 * | 8/2010 | Luo | H04L 63/083 713/182 |
| 8,327,428 | B2 * | 12/2012 | Bailey | G06F 21/41 726/8 |
| 9,858,399 | B2 * | 1/2018 | Mashimo | G06F 21/305 |
| 2015/0088744 | A1 * | 3/2015 | Raduchel | G06Q 20/40 705/44 |
| 2017/0208060 | A1 * | 7/2017 | Hanifen | G06F 16/24573 |

OTHER PUBLICATIONS

M. Ahsant, E. T. Gonzalez and J. Basney, "Security Credential Mapping in Grids," 2009 International Conference on Availability, Reliability and Security, Fukuoka, 2009, pp. 481-486, doi: 10.1109/ARES.2009.93. (Year: 2009).*

* cited by examiner

*Primary Examiner* — Madhuri R Herzog
(74) *Attorney, Agent, or Firm* — Hogan Lovells US LLP

(57) ABSTRACT

The present disclosure provides a data mapping protocol that securely associates the account user information stored in the user pool with corresponding account identity information stored in the identity pool, such that all the account information is searchable, regardless of which pool the information is in. In an embodiment, a mapping service, which may be provided by the resource provider, obtains a set of login credentials and authenticates the login credentials with the user pool. In response to receiving the login credentials and an authentication request, the user pool returns the account credentials associated with the login credentials. The account credentials are used to access the account identifier, and other associate account identity data in the identity pool. Thus, the login credentials from the user pool and the account identifier from the identity are obtained and associated with each other in a searchable data structure.

20 Claims, 9 Drawing Sheets

MAPPING ACCOUNT INFORMATION

BACKGROUND

In many software applications and services, users may sign-up for a user account in order to access certain aspects of the application. Commonly, when a new user signs up, the user defines one or more login credentials such as a username and password, and a user account is generated. The user account is given an account identifier, which identifies the account independently of the login credentials. The account identifier may be associated with the login credentials via an internal account credential such that the user can access their account using the login credentials. This way, for example, if the user forgets their password or username, they are able to change it and associate a new password or username to the account without losing the account. In some environments, the login credentials are stored in a user pool and the account identifier is stored in an identity pool, without a searchable mapping therebetween. Thus, when searching in the user pool for account data will only bring up associated data stored in the user pool, e.g., username, password, email address, etc, and will not bring up the account identifier that is stored in the identity pool. This presents a shortcoming in the amount of control and information accessible to users and application providers.

BRIEF DESCRIPTION OF THE DRAWINGS

Various embodiments in accordance with the present disclosure will be described with reference to the drawings, in which.

DETAILED DESCRIPTION

Figure 1:
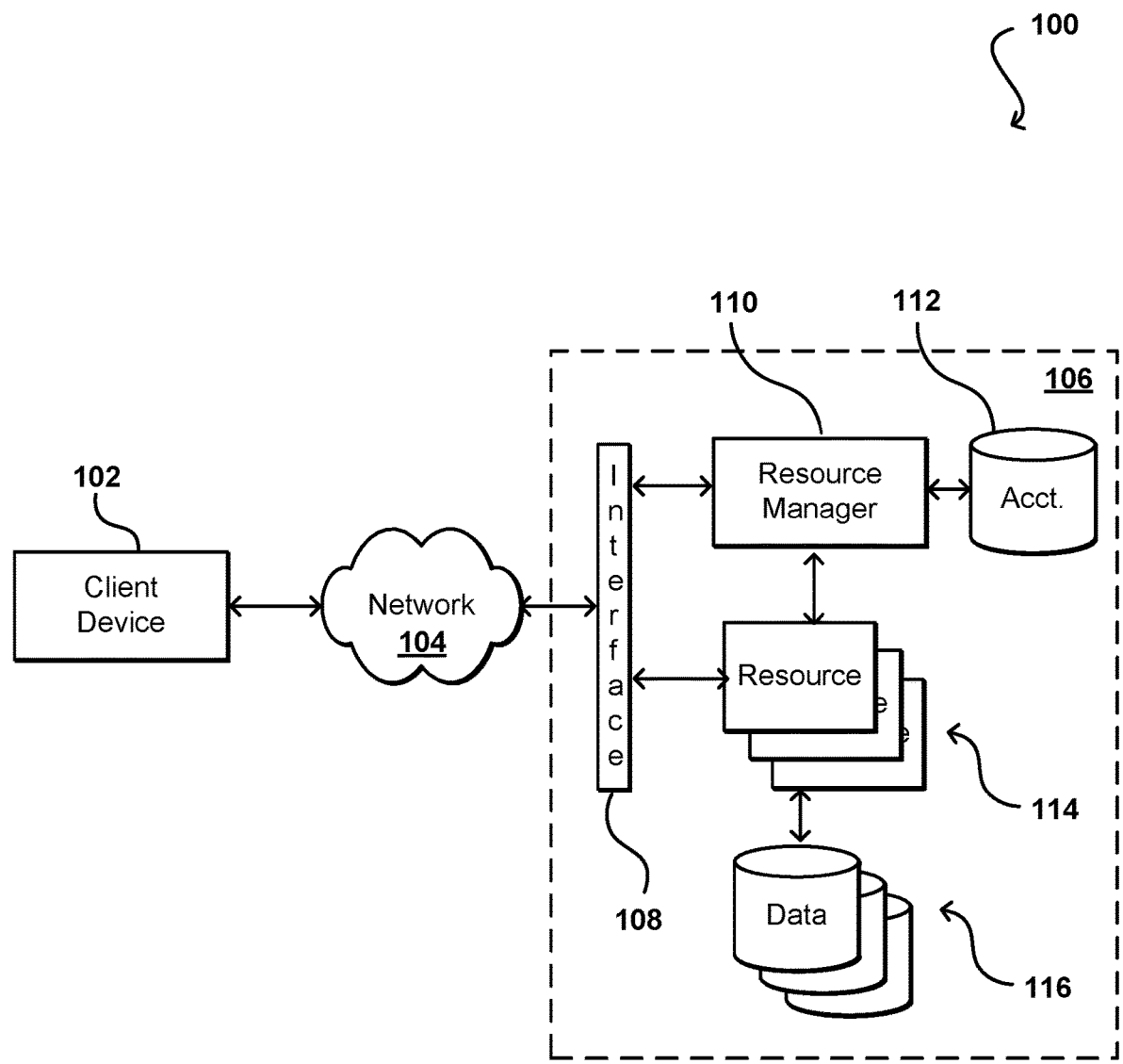
FIG. 1 illustrates an example environment in which aspects of various embodiments can be utilized.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the aforementioned and other deficiencies experienced in content retrieval. Specifically, the present disclosure provides for establishing a searchable mapping between user account information maintained by a first resource and user identity information maintained by a second resource, the first and second resource associated with different security measures to control access those resources. Example resources may include a user pool database and an identity pool database. In accordance with various embodiments, a multi-tenant resource provider, such as a cloud computing platform, provides an environment and tools that can be utilized to build applications, such as games, websites, mobile apps, and the like. The applications may be developed and/or managed by an application provider and accessed or used by a plurality of end users. In some embodiments, in order to access certain aspects of such an application, an end user may sign up for a user account in the application. This allows for personalized aspects such as communication, progress, data, and preferences, among other such personalized aspects.

In accordance with various embodiments, when an end user signs up for a user account, as described above, login credentials such as username, email, and password, along with other associated account user information may be stored in a user pool database; and an account identifier, along with other associated account identity information, may be stored in an identity pool database, separate from the user pool. The present disclosure provides a data mapping protocol that securely associates the account user information stored in the user pool with corresponding account identity information stored in the identity pool, such that all the account information is searchable, regardless of which pool the information is in. Specifically, in an embodiment, a mapping service, which may be provided by the resource provider, obtains a set of login credentials and authenticates the login credentials with the user pool. In response to receiving the login credentials and an authentication request, the user pool returns the account credentials associated with the login credentials. The account credentials are used to access the account identifier, and other associate account identity data in the identity pool. Thus, the login credentials from the user pool and the account identifier from the identity are obtained and associated with each other in a searchable data structure. In an embodiment, based on the association between the login credentials and the account identifier, other account user information stored in the user pool that was already associated with the login credentials may also be mapped to the various account identity information in the identity pool that were already associated with the account identifier. Thus, any uniquely identifying parameter (e.g., username, email, account identifier), can be used to look up any other account information, regardless of to which pool the identifying parameter or the other account information belong.

The data mapping protocol described above may be initiated in response to various events and in various application scenarios. For example, in an embodiment, the data mapping protocol may be called upon during or after a new user registration, such that the account user information generated in the user pool and the account identity information generated in the identity pool are mapped as the account is created, and immediately searchable. In another embodiment, the data mapping protocol is called when a returning user sign in, to create, check, or update the mapping. In some embodiments, the data mapping protocol can be initiated upon a request from a client machine, such as prompted by the application provider. In certain such embodiments, the data mapping protocol may be initiated in response to a query from the application provider to look up certain account information using an identifying parameter.

The technological innovation of the present disclosure is advantageous in many environments and applications having user accounts, some non-limiting examples of which are discussed herein. Additionally, in some environments, user pool data and identity pool data may be stored separately and unassociated for strategic considerations, such as security considerations, computing resource considerations, system architecture design considerations, legacy considerations, and the like. The present techniques provide a means for creating a searchable mapping between the user pool with identity pool without undermining or otherwise affecting native system architecture or security strategy, thus providing a concrete improvement in computer-related technology.

FIG. 1 illustrates an example environment 100 in which aspects of the various embodiments can be implemented. In this example a client is able to utilize a client device 102 to submit requests across at least one network 104 to a multi-tenant resource provider environment 106. The client device 102 may be an application provider device operated by an application provider or an end user device operated by an end user of an application served or hosted by the resource provider environment 106. Accordingly herein, the client may refer to the application provider or the end user. The client device 102 can include any appropriate electronic device operable to send and receive requests, messages, or other such information over an appropriate network and convey information back to a client of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network 104 can be enabled via wired and/or wireless connections. The resource provider environment 106 can include any appropriate components for receiving requests and returning information or performing actions in response to those requests. As an example, the resource provider environment 106 might include Web servers and/or application servers for receiving and processing requests, then returning data, Web pages, video, audio, or other such content or information in response to the request.

In various embodiments, the resource provider environment 106 may include various types of resources that can be utilized by clients for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular client or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the resource provider environment 106 includes a plurality of resources 114 of one or more types. These types can include, for example, application servers operable to process instructions provided by a client or database servers operable to process data stored in one or more data stores 116 in response to a client request. As known for such purposes, the client can also reserve at least a portion of the data storage in a given data store. Methods for enabling a client to reserve various resources and resource instances are well known in the art, such that detailed description of the entire process, and explanation of all possible components, will not be discussed in detail herein.

In at least some embodiments, a client wanting to utilize a portion of the resources 114 can submit a request that is received to an interface layer 108 of the provider environment 106. The interface layer 108 can include application programming interfaces (APIs) or other exposed interfaces enabling a client to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage client accounts and information, resource provisioning and usage, and other such aspects. A client account may refer to an application provider account that the application provider has with the resource provider, or an end user account for an application served or hosted by the resource provider. In the latter example, the end user account may also be managed by the recourse manager 110. A resource manager 110 receiving the request can perform tasks such as to authenticate an identity of the client submitting the request, as well as to determine whether that client has an existing account with the resource provider, either directly or through an application hosted by the resource provider, where the account data may be stored in at least one data store 112 in the resource provider environment. As mentioned, the client may be an application provider, an application end user, or another client-type of the resource provider. The client can provide any of various types of login credentials in order to authenticate an identity of the client to the provider. These login credentials can include, for example, a client name and password pair, biometric data, a digital signature, or other such information. The resource provider can validate this information against information stored for the client. If the client has an account with the appropriate permissions, status, etc., the resource manager 110 can determine whether there are adequate resources available to suit the client's request, and if so can provision the resources or otherwise grant access to the corresponding portion of those resources for use by the client for an amount specified by the request. This amount can include, for example, capacity to process a single request or perform a single task, a specified period of time, or a recurring/renewable period, among other such values. For example, a client that is an application provider may have different access rights than a client that is an end user of an application. If the client does not have a valid account with the provider, the client account does not enable access to the type of resources specified in the request, or another such reason is preventing the client from obtaining access to such resources, a communication can be sent to the client to enable the client to create or modify an account, or change the resources specified in the request, among other such options.

Once the client is authenticated, the account verified, and the resources allocated, the client can utilize the allocated resource(s) for the specified capacity, amount of data transfer, period of time, or other such value. In at least some embodiments, a client might provide a session token or other such credentials with subsequent requests in order to enable those requests to be processed on that client session. The client can receive a resource identifier, specific address, or other such information that can enable the client device 102 to communicate with an allocated resource without having to communicate with the resource manager 110, at least until such time as a relevant aspect of the client account changes, the client is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of client-facing servers that can provide the various APIs and return the appropriate responses based on the API specifications. The interface layer 108 also can include at least one API service layer that in one embodiment consists of stateless, replicated servers which process the externally-facing client APIs. The interface layer 108 can be responsible for Web service front end features such as authenticating clients based on credentials, authorizing the client, throttling client requests to the API servers, validating client input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, clients of the control service. The servers of the Web services layer can be stateless and scaled horizontally as known in the art. API servers, as well as the persistent data store, can be spread across multiple data centers in a region, for example, such that the servers are resilient to single data center failures.

As mentioned, the resources in such an environment can be allocated for any of a number of different purposes for performing a variety of different tasks. As an example, one or more of the resources can be allocated under a client account where the client is an application provider such as an application developer or manager or other such entity. In this example, an application, such as a software program, game, or mobile app, is provided by the application provider, and may be enabled through various resources 114 provided by the resource provider such as an application design engine, a content management systems, and the like. The application may also be hosted by the resource provider. In certain such cases, utilization of various resources 114 by an end user of an application can be attributed to the application provider. In such an environment, as is discussed in more detail later herein, portions of various resources 114 can be allocated dynamically and on a task-specific basis. There can be resources allocated to perform a specific type of processing, and those resources can be allocated on an as-needed basis where the application provider is only charged for the actual processing in response to a specific task. The resource provider environment 106 enables application providers to leverage an on-demand cloud resource support for their applications and other such offerings, both during development of the application and during use of the application, including by end users.

Figure 2:
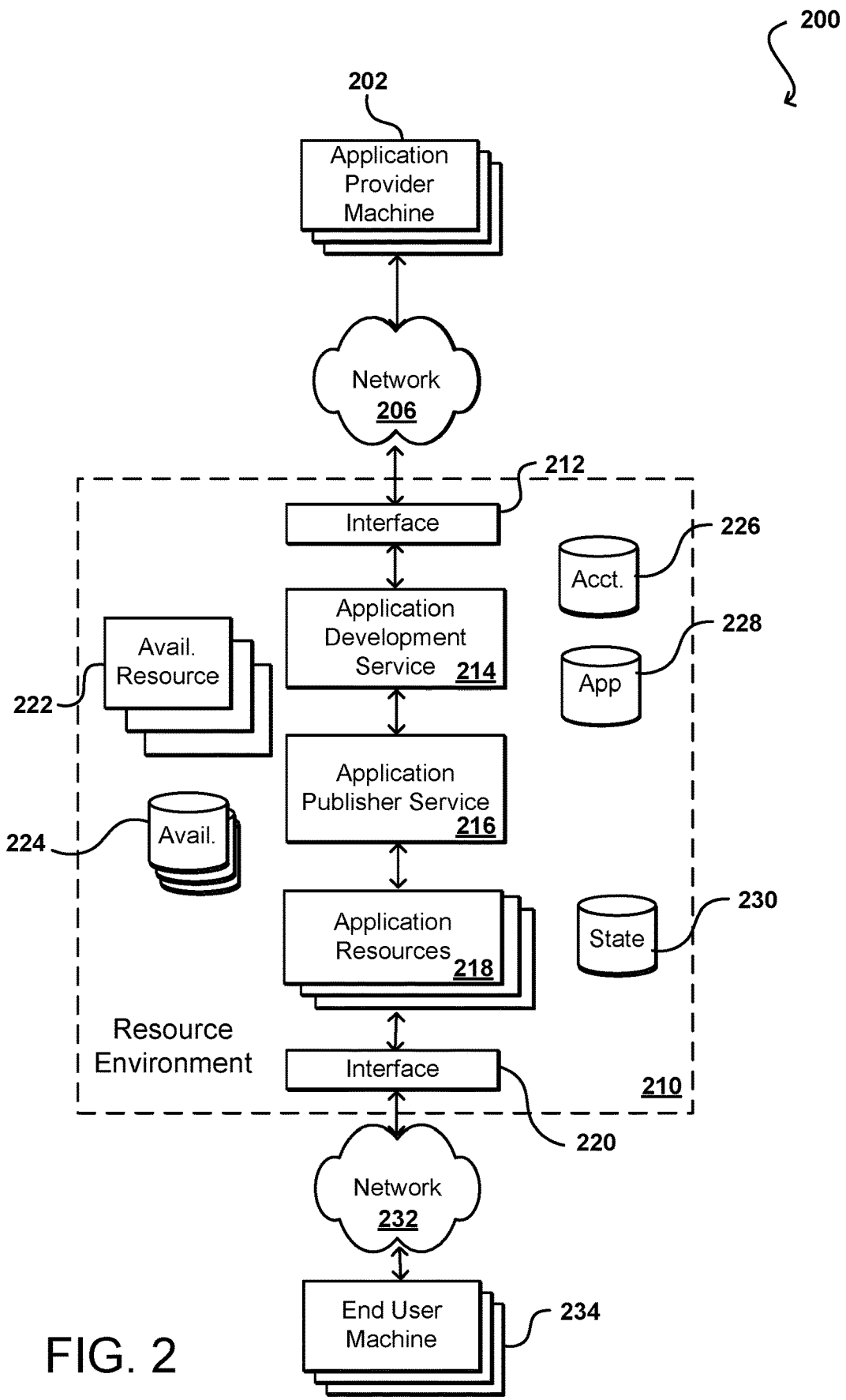
FIG. 2 illustrates an example environment in which an application is provided to an end user, in which aspects of various embodiments can be utilized.

FIG. 2 illustrates an example environment 200 in which aspects of the various embodiments can be implemented. Specifically, FIG. 2 illustrates an example environment 200 in which an application provider provides an application to an end user, through a resource provider environment maintained by a resource provider 210. In this example, the application provider is able to utilize one or more application provider machines 202 to submit requests across at least one network 206 to a resource provider environment 210. The application provider machines 202 can include any appropriate electronic device operable to send and receive requests, messages, or other such information over an appropriate network and convey information back to a user of the device. Examples of such devices include personal computers, tablet computers, smart phones, notebook computers, and the like. The at least one network 206 can include any appropriate network, including an intranet, the Internet, a cellular network, a local area network (LAN), or any other such network or combination, and communication over the network can be enabled via wired and/or wireless connections. The application provider machines 202 can access the resource provider environment to develop the application, manage the application, collect information, interact with end users, among others. The resource environment 210 can include any appropriate components for receiving requests and returning information or performing actions in response to those requests. As an example, the service provider environment might include computing resources 222, such as Web servers and/or application servers for receiving and processing requests, then returning content or information in response to the request. The environment can also include various repositories 224 that can be allocated for use by, or on behalf of, various clients or applications of the environment.

In various embodiments, the resource environment 210 may include various types of electronic resources 222 that can be utilized by multiple clients, such as application providers and end users, for a variety of different purposes. In at least some embodiments, all or a portion of a given resource, or set of resources, might be allocated to a particular client or allocated for a particular task, for at least a determined period of time. The sharing of these multi-tenant resources from a provider environment is often referred to as resource sharing, Web services, or "cloud computing," among other such terms and depending upon the specific environment and/or implementation. In this example, the resource provider environment includes a plurality of electronic resources 222 of one or more types. These types can include, for example, application servers operable to process instructions provided by a client or database servers operable to process data stored in one or more repositories 224, in response to a client request. In some embodiments, the abovementioned user pool database and identity pool database may be stored in one or more of the repositories 224. As known for such purposes, the client can also reserve at least a portion of the data storage in a given data store. Methods for enabling a client to reserve various resources and resource instances are well known in the art, such that detailed description of the entire process, and explanation of all possible components, will not be discussed in detail herein.

In an example embodiment, at least some of the resources 222 are used to support an application development service 214, which includes platforms and services useful in the development and providing of software applications. For example, the software application may be an electronic gaming application that includes three-dimensional graphical content, among other such options, and the application development service 214 may include an electronic game development platform. The application provider machine can access the application development service via an interface layer 212. The interface layer 212 can include application programming interfaces (APIs) or other exposed interfaces enabling a user to submit requests to the resource provider environment 210. The interface layer 212 in this example can also include other components as well, such as at least one Web server, routing components, load balancers, and the like. In this example, the interface layer 212 provides a means for the application provider machine to interact with the application development service, thereby enabling the application provider to user the application development service to create, develop, and manage an application.

In at least some embodiments, a portion of the resources 222 can be allocated in response to receiving a request to an interface layer 212 of the resource environment 210. When a request to provision a resource is received to the interface layer 212, information for the request can be directed to a resource manager or other such system, service, or component configured to manage user accounts and information, resource provisioning and usage, and other such aspects. A resource manager receiving the request can perform tasks such as to authenticate an identity of the client submitting the request, as well as to determine whether that client has an existing account with the resource provider, where the account data may be stored in at least one data store in the provider environment. The client may be an application provider or an end user of an application. In an embodiment, when the client is an application provider, the application provider may log onto a service provided by the resource provider, such as an application design service 214. In an embodiment, when the client is an end user of an application, the end user may log onto the application. In either case, authentication may be handled by the resource provider.

A client can provide any of various types of credentials in order to authenticate an identity of the client to the resource provider. These credentials can include, for example, a username and password pair, biometric data, a digital signature, or other such information. These credentials can be provided by, or obtained from, a number of different entities, such as an identity provider, a key management service, a corporate entity, a certificate authority, an identify broker such as a SAML provider, and the like. In some embodiments, a client can provide information useful in obtaining the credentials, such as user identity, account information, password, user-specific cryptographic key, client number, and the like. The identity provider can provide the credentials to the resource provider environment and/or to a client device, whereby the client device can utilize those credentials to obtain access or use of various resources in the provider environment, where the type and/or scope of access can depend upon factors such as a type of client, a type of client account, a role associated with the credentials, or a policy associated with the user and/or credentials, among other such factors.

A resource manager (or another such system or service) can also function as a virtual layer of hardware and software components that handles control functions in addition to management actions, as may include provisioning, scaling, replication, etc. The resource manager can utilize dedicated APIs in the interface layer 212, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 212 in at least one embodiment includes a scalable set of client-facing servers that can provide the various APIs and return the appropriate responses based on the API specifications. The interface layer also can include at least one API service layer that in one embodiment consists of stateless, replicated servers which process the externally-facing client APIs. The interface layer can be responsible for Web service front end features such as authenticating clients based on credentials, authorizing the client, throttling client requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, clients of the control service. The servers of the Web services layer can be stateless and scaled horizontally as known in the art. API servers, as well as the persistent data store, can be spread across multiple data centers in a region, for example, such that the servers are resilient to single data center failures.

The application development service 214 can perform tasks such as to enable the checking out or locking of items for an application, the management of application files amongst developers, the providing of tools or templates to use for application development, and the like. The development service 214 can also provide communication services such as messaging and content sharing, among other such options. The application development service 214 can store information for an application to at least one application repository 228, where the repositories can include graphics files, code, audio files, and the like. The application development service 214 can also work with an account manager, or at least maintain information in an account data store 226, such that the application development service 214 can determine which resources, including amounts or types of resources, can be allocated on clientbehalf of an application provider for the development of one or more client applications or other such content. The account data can also specify who is authorized to work on the application content, including types of content accessible, actions able to be taken, and the like.

Once the application development reaches an appropriate stage in the development cycle or pipeline, as may relate to alpha or beta testing, actual release or updating, etc., the appropriate content can be made accessible to an application publisher service 216. The application publisher service 216 can receive instructions regarding the type of release, format of the release, and other appropriate information, and can cause the application content to be published to an appropriate location for access. While illustrated as part of the service provider environment 210, it should be understood that components such as the application servers or application publisher could be executed on a local client machine as well, whether one of the application provider machines 202 or otherwise. If the application is to be made available to end users, applications, or other such persons or entities, the application publisher service 216 may publish the application content to an array of application resources 218 which can run the application and enable end user machines 234 to access the application content over one or more networks 232, which may be different from the network(s) 206 used for application development. This can include, for example, dedicated application networks, the Internet, cellular networks, and the like. The end user machines 234 can communicate with the appropriate interfaces of an interface layer 220 to obtain the application content. In some embodiments the end user machines 232 will download the application content for execution on the individual machines, and will upload (or otherwise communicate) application data, messages, and other information to the application resources 218, as well as to other end users, social networking sites, or other such recipients. The application resources 218 can cause state information for the various instances of the application to be stored to at least one application state repository 230. This can hold state for the application as a whole or for individual application sessions, among other such options. In some embodiments the application content can be executed by the application servers and streamed in near real time to the end user machines 234. In some embodiments there may alternatively be a mix of application content executed on the end user machines 234 and the application servers. Peer to peer connections among the end user machines 234 and other communications can be utilized as well in various embodiments.

As mentioned, such an environment 210 enables clients to obtain and configure computing resources over a network such as the Internet to perform various types of computing operations (e.g., execute code, including threads, programs, software, routines, subroutines, processes, etc.). Thus, developers, such as application providers, can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In some embodiments, the application provides user accounts, which enables access to certain aspects of the application, such as communication, progress tracking, data, and preferences, among others. The user account also enables a consistent and continuous end user experience across different sessions and across different user devices. When an end user signs up for a user account, as described above, login credentials such as username, email, and password, along with other associated account user information may be stored in or across one or more storage resources such as provided by electronic resources 222 or repositories 224 of the resource provider environment 210. When a new end user signs up, a user account is created within the application and supported by the resource provider 210. The user account is given an account identifier. The account identifier, along with other associated account identity information, may also be stored in or across one or more of storage resources such as provided by electronic resources 222 or repositories 224 of the resource provider environment 210. However, the login credentials, along with other associated account user information may be stored in a user pool; and an account identifier, along with other associated account identity information, may be stored in an identity pool, separate from the user pool. The user pool and the identity pool may be virtual databases generated from the electronic resources 222 or repositories 224.

Figure 3:
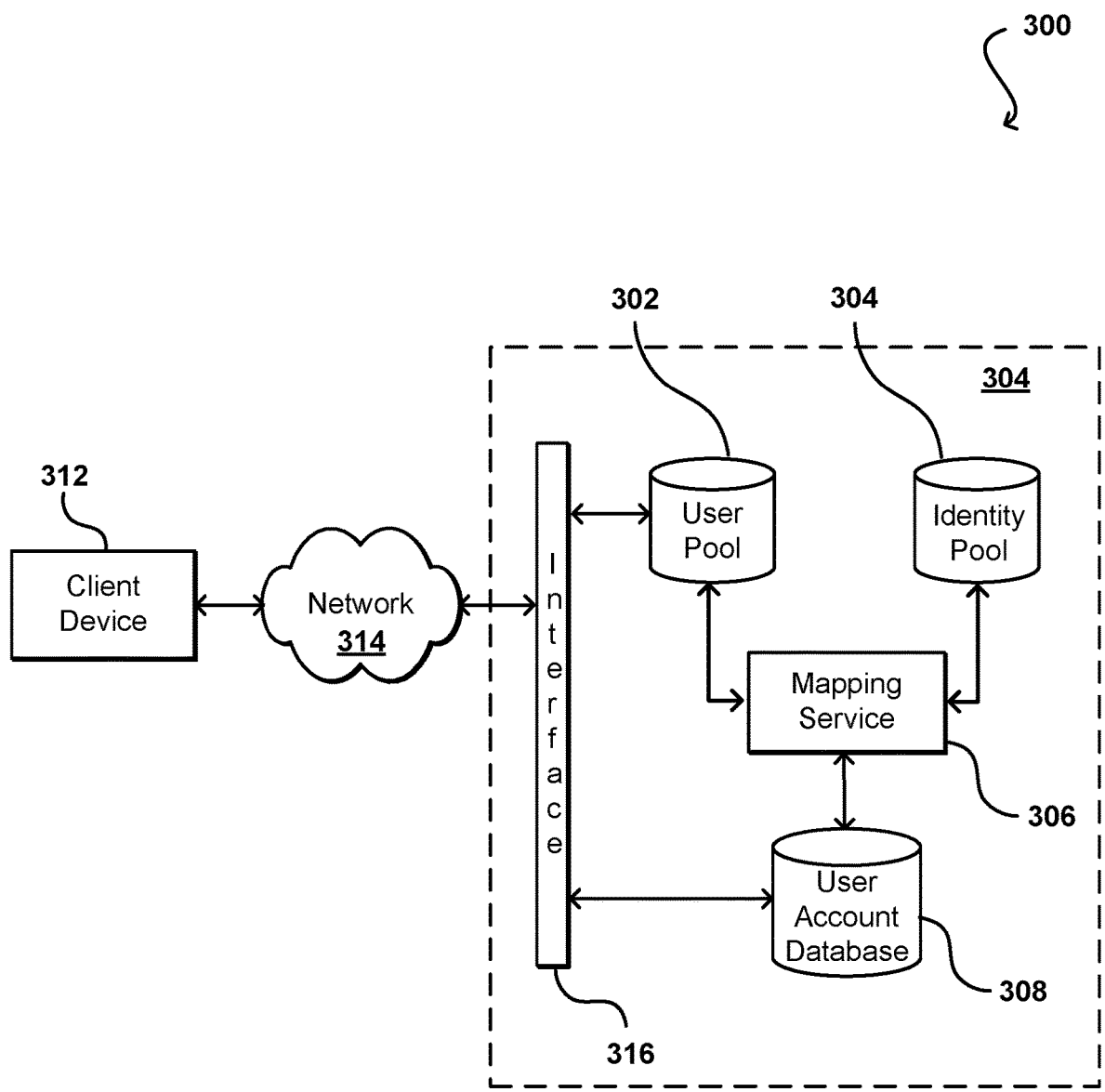
FIG. 3 illustrates a diagram of an example system implementation, in accordance with various embodiments.

FIG. 3 illustrates a diagram of an example system implementation 300 for mapping the account user information stored in the user pool with corresponding account identity information stored in the identity pool, in accordance with various embodiments. The system 300 includes a resource provider environment 310, such as generated by the resource provider environment 210 of FIG. 2 or the resource provider environment 106 of FIG. 1. A user pool 302 holds the account user information of a user account. The account user information may include login credentials such as username, email, and password, among other user entered information. An identity pool 304 holds the account identity information of the user account, which may include an account identifier by which the account is identified within the system and by the resource provider. In some embodiments, the account identifier is generated by the resource provider upon creating an account in response to a new end user sign-up. The account identifier may be associated with the login credentials via an account credential administered by the resource provider such that the user signs in using the login credentials, the resource provider identifies the corresponding account and serves the application populated with the relevant account information, such as progress, data, and preferences.

In an embodiment, a mapping service 306 accesses both the user pool and the identity pool to retrieve the account user information of a user account from the user pool and the account identity information of the user account from the identity pool, and creates a mapping between the account user information and the corresponding account identity information in a data structure user account database 308. The user account database 308 may be virtual databases generated from the electronic resources 222 or repositories 224 (FIG. 2). The data structure is searchable and the user account database 308 can be queried to obtain account user information or account identity information given a uniquely identifying parameter (e.g., username, email, account identifier). In an embodiment, the user pool 302 and the user account data structure 308 may be accessible to a client device 312 via interface 316. The client device 312 may access to the interface via a network 314. The client device 312 may be an application provider device or an end user device. The client device 312 may be able to query the user account database 308 to obtain account user information or account identity information given a uniquely identifying parameter (e.g., username, email, account identifier), regardless of which whether the uniquely identifying parameter is in the user pool or the identity pool. The mapping service 308 may perform a mapping protocol to create the mapping between the account user information and the corresponding account identity information.

Figure 4:
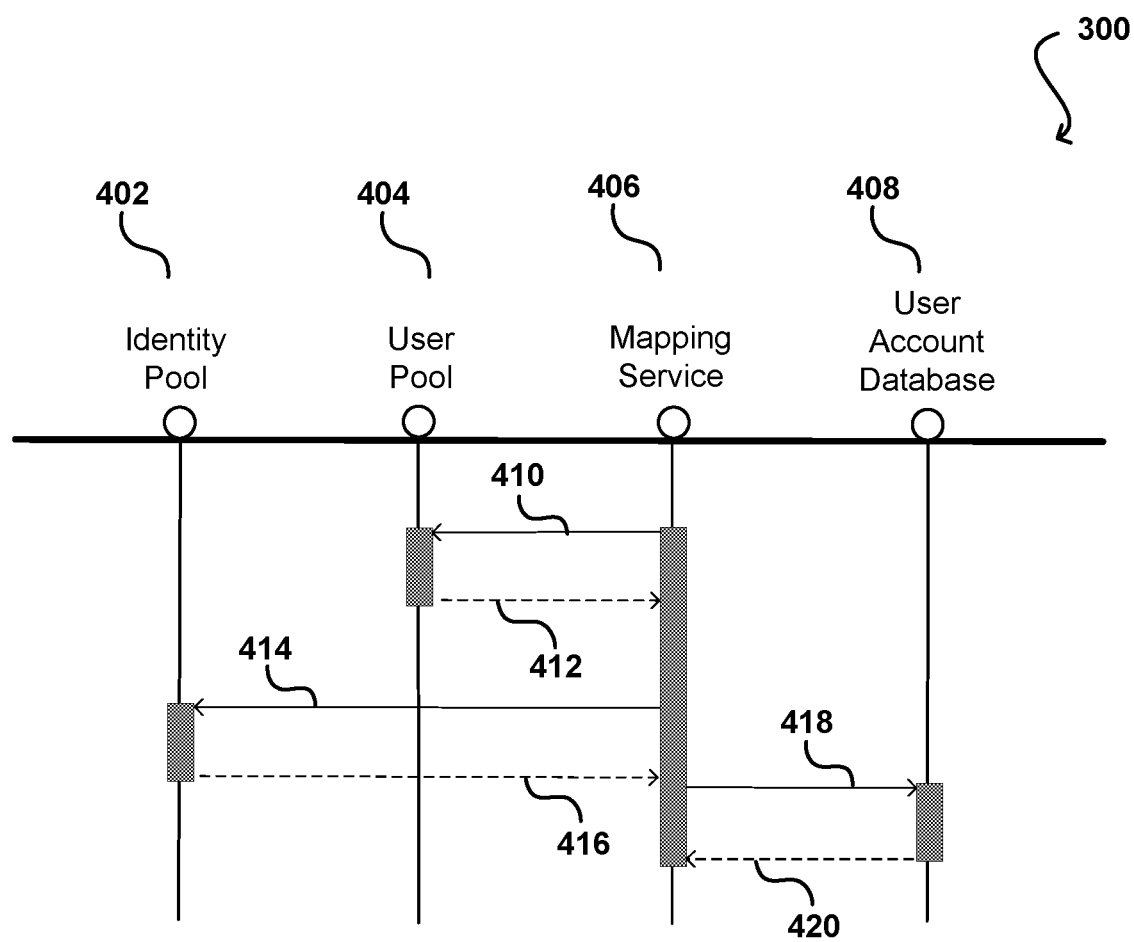
FIG. 4 illustrates a sequence diagram of a mapping protocol, in accordance with various embodiments.

FIG. 4 illustrates a sequence diagram 400 of the mapping protocol, according to various example embodiments. Specifically, the sequence diagram 400 illustrates the interaction between an identity pool 402, a user pool 404, a mapping service 406, and an account database 408. In an embodiment, upon initiation of the mapping protocol, the mapping service 406 sends a login credentials and a request for account credentials to the user pool 404 (request 410). The login credential may include a username/password pair, an email, a token, or the like. The user pool 406 authenticates the login credentials and issues the account credentials to the mapping service 406 upon authentication (response 412). The mapping service 406 then sends the account credentials and a request for account identity information, including an account identifier, to the identity pool 402 (request 414). In an embodiment, the request 414 may be a lookup function performed by the mapping service using the account credentials. The account identity information associated with the account credentials is returned to the mapping service 406 (return 416). In an embodiment, the identity pool 402 may not contain any account identity information associated with the account credential, which may be the case if an account has not yet been created. In such a case, the mapping service 406 may trigger an account and account identifier to be created in the identity pool 402 and associated with the account credential provided by the mapping service. Once created, the account identifier can be returned to the mapping service 406 (response 416). At this point in the sequence, the mapping service 406 has the login credentials of and the corresponding account identifier. Thus, the mapping service 406 sends the associated login credentials and account identifier (request 418) to the user account database 408 to be entered and mapped in a searchable data structure. In an embodiment, the user account database 408 may include a mapping between the login credentials and the account identifier, which can be used to look up any additional associated account information in the user pool or the identity pool without requiring account credentials. In another embodiment, the user account database 408 may include all the account information from the user pool and the identity pool that are associated with the same user account such that the information and association can be served from the user account database 408 without accessing the user pool or identity pool. Upon completion of the mapping, and the user account database 408 has been updated, the user account database 408 may return a confirmation to the mapping service (response 420). In an embodiment, the mapping protocol comprising a plurality of discrete computing tasks and is performed by a resource provider, in which the resource provider selects at least one resource to run the mapping protocol and allocates the selected resource(s) for a period of time or dynamically to perform each task.

In some embodiments, once the database 408 has been updated with the mapping, and the mapping service receives confirmation of the same, the mapping service may refresh, deleting any stored credentials or account information. The data mapping protocol described above may be initiated in response to various events and in various application scenarios. For example, in an embodiment, the data mapping protocol may be called upon during or after a new user registration, such that the account user information generated in the user pool and the account identity information generated in the identity pool are mapped as the account is created, and immediately searchable. In another embodiment, the data mapping protocol is called when a returning user sign in, to create, check, or update the mapping. In some embodiments, the data mapping protocol can be initiated upon a request from a client machine, such as prompted by the application provider. In certain such embodiments, the data mapping protocol may be initiated in response to a query from the application provider to look up certain account information using an identifying parameter.

Figure 5:
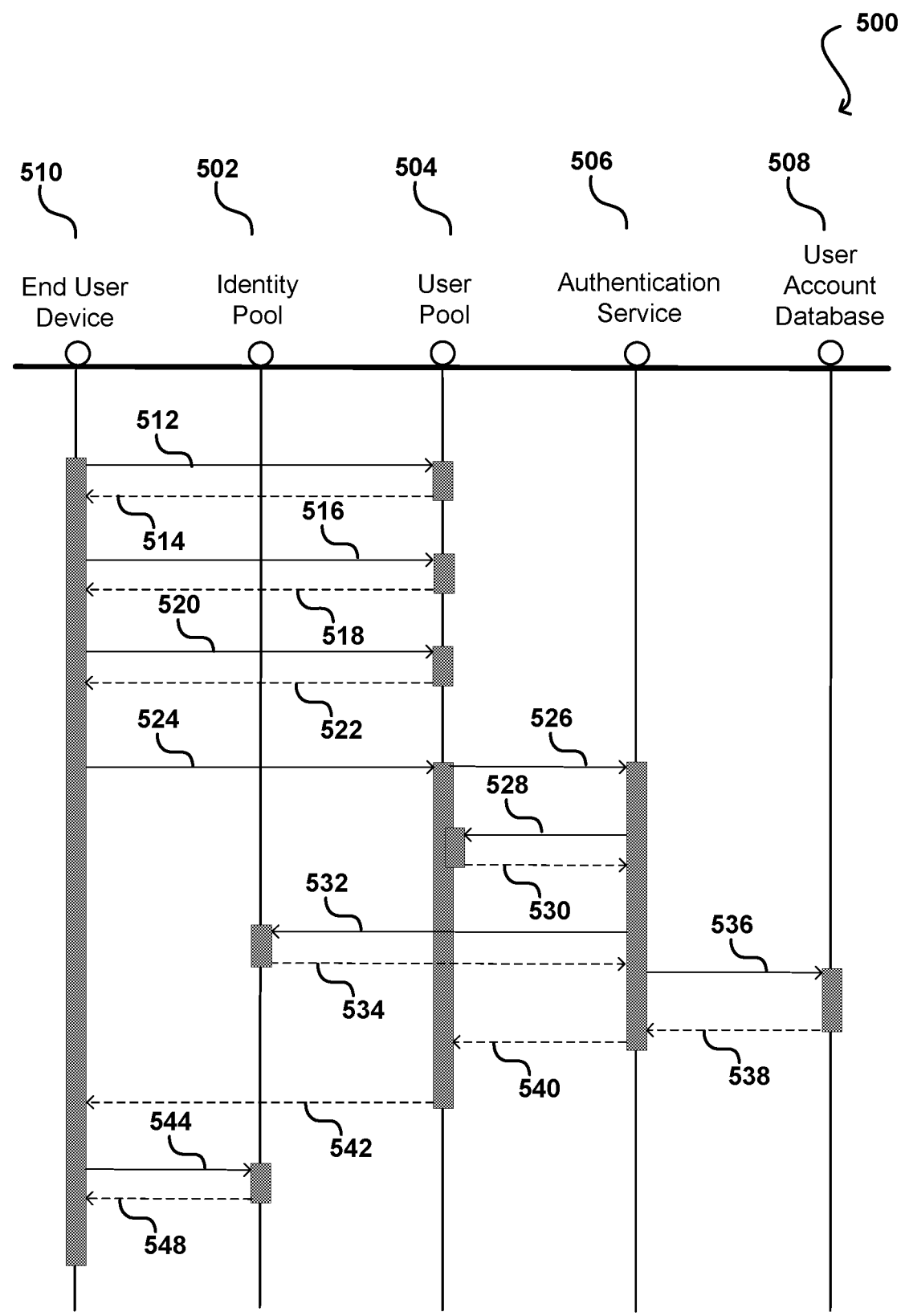
FIG. 5 illustrates a sequence diagram of a user registration and authentication protocol, in accordance with various embodiments.

As a specific example, the mapping protocol 400 can be nested within a user registration and authentication protocol. FIG. 5 illustrates a sequence diagram 500 of such a user registration and authentication protocol, in accordance with various embodiments. Specifically, the sequence diagram 500 illustrates the interaction between an end user device 510, an identity pool 502, a user pool 504, an authentication service 506, and an account database 508. In an embodiment, the identity pool 502, the user pool 504, the authentication service 506, and the account database 508 reside in a resource provider environment, which may communicate with the end user device 510 via a network, such as described with respect to FIG. 3 above. In this example, the registration and authentication protocol is initiated upon a new user sign-up, in which the end user device 510 sends a registration email address along with a registration request with to the user pool 502 (request 512). It should be noted that the registration and authentication protocol is initiated in response to other events, as may include a returning user sign in. The end use device 510 may also send one or more additional registration parameters such as username and/or password. Upon receiving the request, the user pool registers the email address and sends a confirmation prompt to the email address (response 514) to ensure the end user has access to the email address. In some embodiment, an alternate form of contact information may be used in place of the email address, such as a phone number. Upon the end user following the prompt, a request is sent from the user device 510 to the user pool indicating that the end user indeed has access to the email address (request 516). The user pool 504 sends a confirmation back to the user device confirming registration (response 518). At this point, the registration parameters, such as email, username, and password are stored in the user pool as account user information. In some embodiments, an account and account identity information, such as a generated account identifier, is created in the identity pool.

After the user account is created, the end user device 510 can initiate an authentication request to the user pool 504 to access the account (request 520), upon which the end user device 510 receives an authentication challenge requesting login credentials (response 522). The end user device 510 makes another call to the user pool 504 providing the login credentials (e.g., username and password) (request 524). The user pool 504, upon receiving the login credentials, calls the authentication service 506 to authenticate the login credentials (request 526), and thereby provides the authentication service 506 with the login credentials.

In this example, upon receiving a request to authenticate login credentials, the authentication service 506 invokes a mapping protocol, temporarily placing request 528 from the user pool on hold while the mapping protocol is executed. Similar to the mapping protocol 400 of FIG. 4, the authentication service 506 sends the login credentials and a request for account credentials to the user pool 504 (request 528). The user pool 502 authenticates the login credentials and issues the account credentials to the authentication service 506 upon authentication (response 530). In an embodiment, the user pool 504 receives request 528 and issues response 530 as a new authentication instance, independent from the authentication of the end user device 510. In accordance with various embodiments, because the request for account credentials is sent from the authentication service 506, which is hosted on the resource provider environment, the request in at least this situation is secure. As such, the user pool can issue the account credentials (response 530). In this way, the account credentials are not passed outside of the secure resource provider environment.

The authentication service 506 then sends the account credentials and a request for account identity information, including an account identifier, to the identity pool 502 (request 532). In an embodiment, the request 532 may be a lookup function performed by the mapping service using the account credentials. The account identity information associated with the account credentials is returned to the authentication service 506 (response 534). In an embodiment, the identity pool 502 may not contain any account identity information associated with the account credential, which may be the case if an account has not yet been created. In such a case, the authentication service 506 may trigger an account and account identifier to be created in the identity pool 502 and associated with the account credential provided by the mapping service. Once created, the account identifier can be returned to the authentication service 506 (response 534). At this point in the sequence, the authentication service 506 has the login credentials of and the corresponding account identifier. Thus, the authentication service 506 sends the associated login credentials and account identifier to the account database 508 to be entered and mapped in a searchable data structure (request 536). Upon completion of the mapping and the database 508 has been updated, the database 508 may return a confirmation to the authentication service (response 538).

Upon receiving the confirmation from the database 508, the authentication service 506 answers request 526 from the user pool and indicates that the login credentials provided by the end user device 510 is authenticated (response 540), since the authentication service 506 already authenticated the login credentials during execution of the mapping protocol. The user pool 504 then responds to request 524 from the user device and issues account credentials to the end user device 510 (request 542). The end user device 510 can then send a request to the identity pool 502 with the account credentials (request 544), and the identity pool 502 issues the account identity information associated with the account credentials to the end user device 510 (response 548). The end user device 510 can then access the user account, which may include rendering the user account at the end user device 510 using the account identity information obtained through the account credential, and giving the end user device 510 rights to make changes to the user account. In some embodiments, there may be more calls made between the above described components than illustrated. There may also be calls made between more components than illustrated. Additional calls may be implemented to carry out additional functions according to various design criteria. While such alternative designs fall within the scope of the present disclosure, they are not described in detail herein so as not to obscure of the present disclosure.

Figure 6:
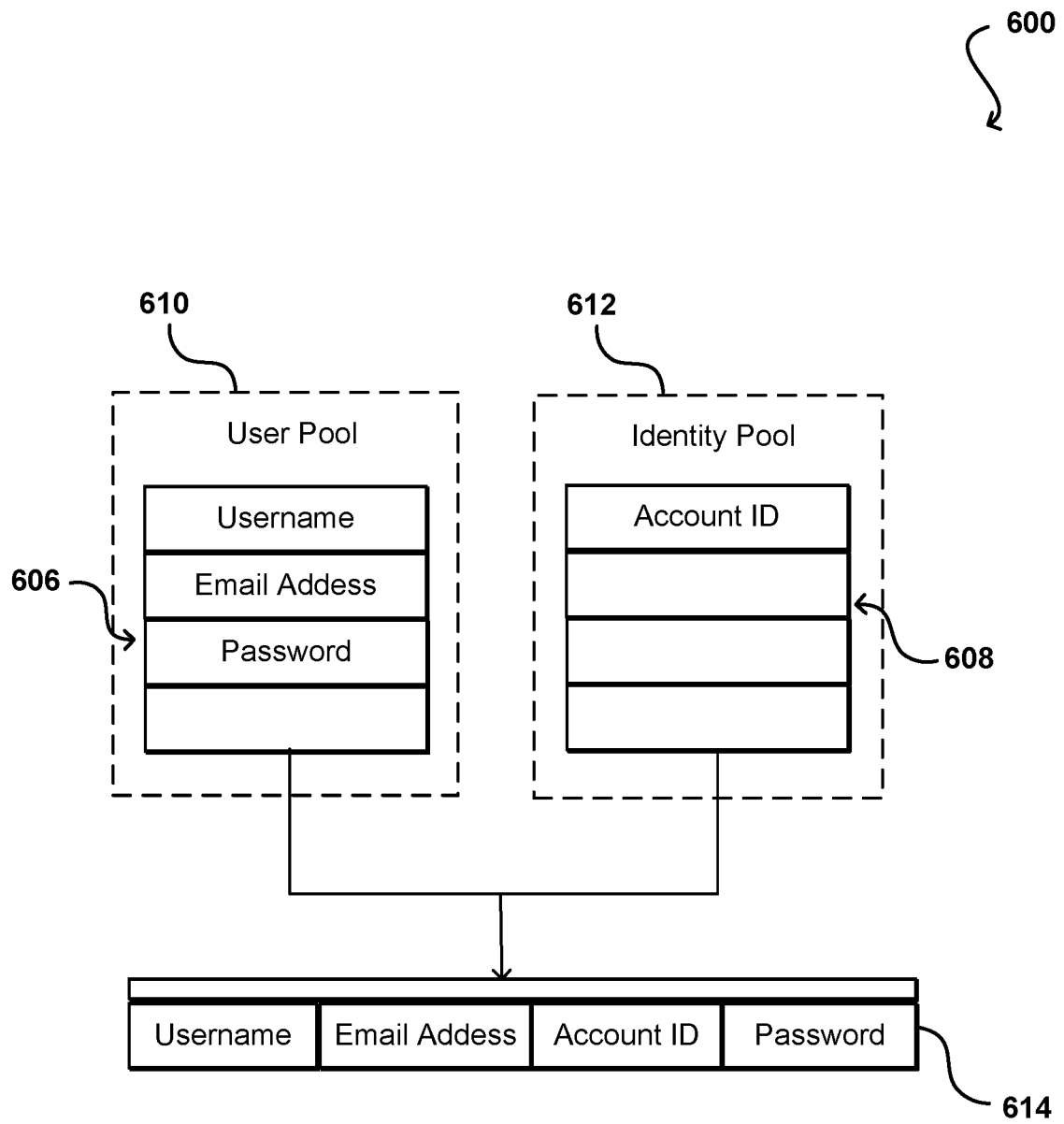
FIG. 6 illustrates an example representation of account data organization, in accordance with various embodiments.

As illustrated in FIGS. 4 and 5, the mapping protocol creates a mapping between account user information stored in a user pool and account identity information stored in an identity pool, and creates the mapping within a searchable data structure in a database. FIG. 6 illustrates an example representation 600 of account data organization, in accordance with various embodiments. In an embodiment, a user account is at least in part defined by a plurality of account information, including a plurality of discrete account parameters. The plurality of account parameters may include a plurality of account user parameters 606, and a plurality of account identity parameters 608. Example account user parameters 606 include username, email address, and password. Example account identity parameters 608 include account identifier. The account user parameters 606 may be also be referred to more generally as account user information, which may include more information than the discrete account user parameters 606. Similarly, the account identity parameters 606 may also be referred to more generally as account identity information, which may include more information that the discrete account identity parameters 608. The account user information, including the account user parameters 606, is stored in a user pool 610 database, and the account identity information, including the account identity parameters 608, is stored in an identity pool 612 database. Although the account user information and the account identity information are for the same user account, the user pool 610 and the identity pool 612 may be stored separately and independent of each other. Employing the techniques of the present disclosure, a searchable data structure such as table 614 is created, mapping the account user parameters 606 to the account identity parameter 608. The searchable data structure 614 can be accessed to look up account information regardless of whether the information is in the user pool 610 or the identity pool 612. In an example in which the account user parameters include a username, an email address, and a password, and the account identity parameters include an account identifier, if one of these parameters is known and provided in a query, the others can be obtained through the table 614. In another embodiment, the searchable data structure 614 may include all the account information from the user pool and the identity pool that are associated with the same user account such that the information and association can be looked up from the searchable data structure 614 without accessing the user pool 610 or identity pool 612. In an embodiment, the searchable data structure 614 may only include a mapping between a uniquely identifying parameter from the user pool 610, such as email address, and a uniquely identifying parameter from the identity pool 612, such as account identifier. The mapping can then be used to go between and look up the account user parameters 606 in the user pool 610 and the associated account identity parameters 608 in the identity pool 612 without requiring account credentials.

Figure 7:
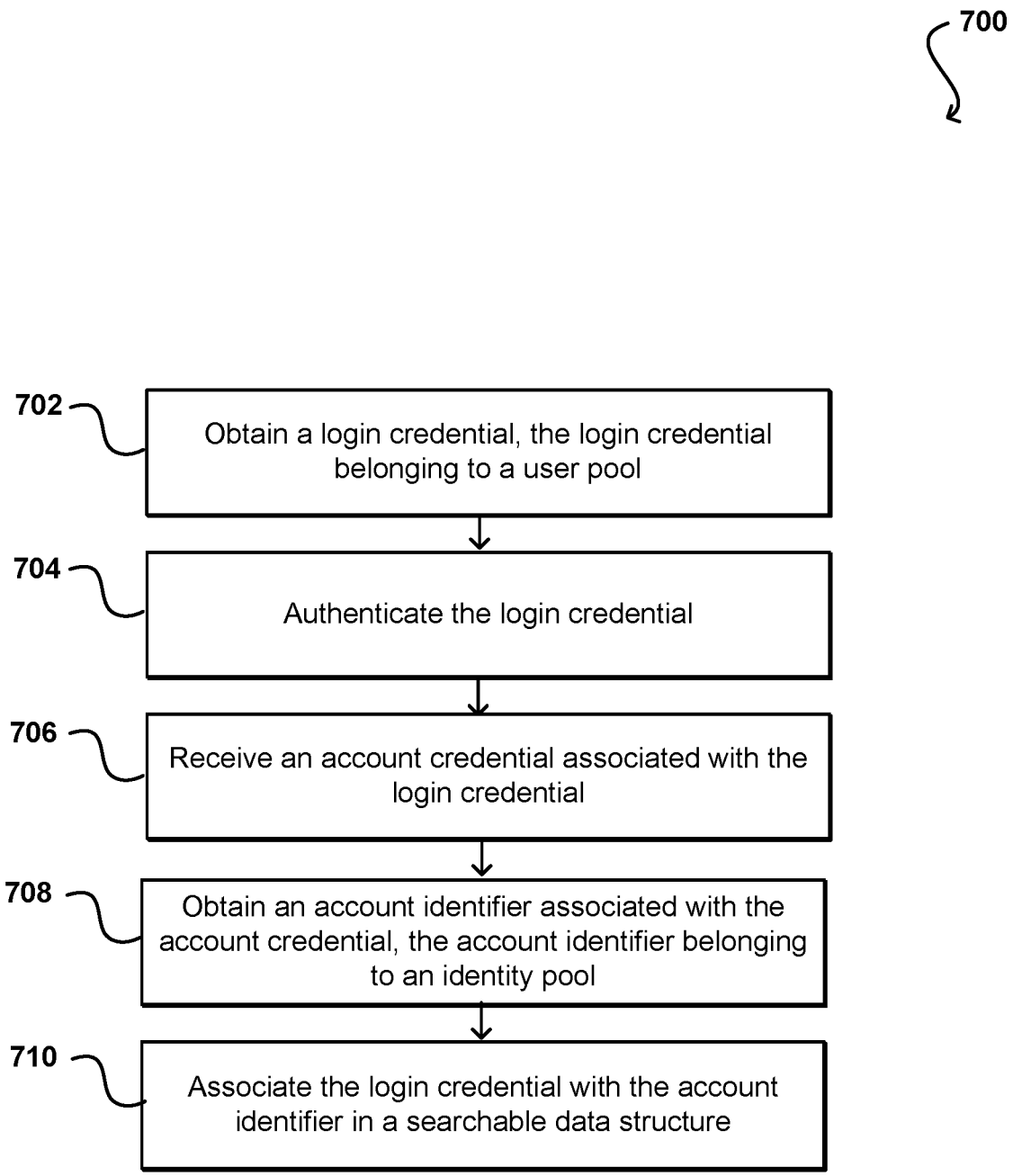
FIG. 7 illustrates an example process for a mapping protocol, in accordance with various embodiments.

FIG. 7 illustrates an example process 700 for mapping account user information in a user pool to corresponding account identity information in an identity pool, or a mapping protocol, in accordance with various embodiments. In an embodiment, the process 700 may be executed at a resource provider environment, such as the resource provider environment of FIG. 1, 2 or 3, and via a mapping service provided by the resource provider. It should be understood that, for any process discussed herein, there can be additional, fewer, or alternative steps performed in similar or alternative orders, or in parallel, within the scope of the various embodiments unless otherwise stated. In this example, the mapping service obtains a login credential in which the login credential belongs to a user pool 702. The user pool may also contain other account user information. The account user information may include one or more specific account user parameters such as username, email address, password, and the like. The login credential may be obtained various different ways. For example, the login credential may have been provided by a client device during a login process. The login credential may have been provided by a client device during a query process. The login credential may have been fetched by the mapping service from the user pool, such as during a regularly scheduled mapping process. The login credentials are authenticated 704, and upon authentication of the login credential, an account credential associated with the login credential is received 706. The mapping service may then use the account credential to look up and obtain an account identifier, such as an account ID, which belongs to an identity pool 708. In some embodiments, the identity pool may also include other account identity information, including one or more account identity parameters. Once the account identifier is obtained, the login credential is associated with the account identifier in a searched data structure 710. In some embodiments, other account user information from the use pool is also associated with the other account identity information through the searchable data structure.

In an embodiment, process 700, also called mapping protocol 700, is a part of a user authentication process, in which an authentication service of the resource provider receives a login request and login credentials from a client device, and runs the mapping protocol 700 using the received login credentials. Account credentials are obtained during the mapping protocol 700, and provided to the client device, thereby granting a successful login. In an embodiment, mapping protocol 700 is a part of a new end user registration process, in which a registration service of the resource provider receives a registration request for a user account that includes the login credentials, the login credentials uniquely associated with the user account. The login credentials are stored in the user pool. The account identifier is generated by the resource provider for the user account and stored in the identity pool. In an embodiment, mapping protocol 700 is a part of an information lookup process performed by a lookup service, in which a query comprising a known account parameter is received, for example, from a client device. The known parameter may be an account user parameter belonging to the user pool or an account identity parameter belonging to the identity pool. The lookup service accesses the searchable data structure, and returns an account user parameter, an account identity parameter, or both. In an embodiment, mapping protocol 700 comprising a plurality of discrete computing tasks and is performed by the resource provider, in which the resource provider selects at least one resource to run the mapping protocol and allocates the selected resource(s) for a period of time or dynamically to perform each task. In an embodiment, the login credentials and account identifier are associated within a user account in a software application environment, such as an electronic game, website, or mobile app.

Figure 8:
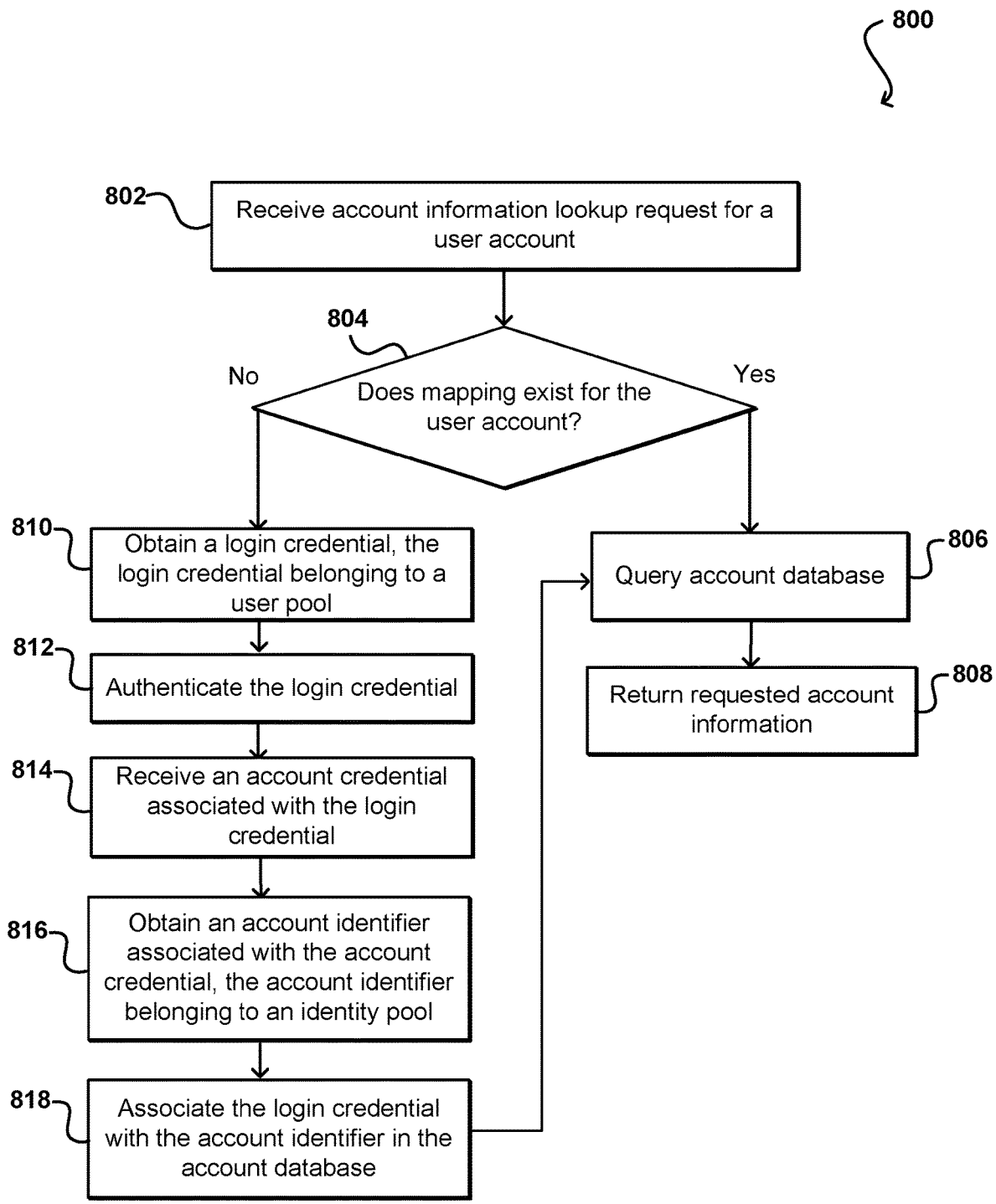
FIG. 8 illustrates an example process for handling an account information lookup request used to implement aspects of various embodiments, in accordance with various embodiments.

FIG. 8 illustrates an example process 800 for handling an account information lookup request, in accordance with various embodiments. In an embodiment, the process 800 may be executed at a resource provider environment, such as the resource provider environment of FIG. 1, 2 or 3, and via a lookup service provided by the resource provider. It should be understood that, for any process discussed herein, there can be additional, fewer, or alternative steps performed in similar or alternative orders, or in parallel, within the scope of the various embodiments unless otherwise stated. In this example, the lookup service receives an account information lookup request 802. The lookup request may include a known account parameter of a user account and the request return information may be one or more designated unknown account parameters, such as an account user parameter stored in a user pool or an account identity parameter stored in an identity pool. Upon receiving the request, the lookup service may determine if a user pool—identity pool mapping exists for the user account 804. If a mapping does exist, then the lookup service queries the account database 806 and returns the requested information 808, which may include an account user parameter, an account identity parameter, or both.

If a mapping does not exist, then a mapping protocol, similar to the mapping protocol 800 of FIG. 8, is invoked and performed by the mapping service or the lookup service, in which the service obtains a login credential for the user account 810 and authenticates the login credential 812, such as through an authentication service. Upon authentication of the login credential, the service receives an account credential associated with the login credential 814, and then looks up an account identifier associated with the account credential 816. The account identifier belongs to an identity pool, which may also include other account identity information. The login credential and the account identifier are then associated in a searchable data structure in the account database 818. The mapping is thus created, and the lookup service can query the account database 806 and return the requested information 808. In some embodiments, when the login credential is associated with the account identifier, other account user parameters in the user pool are also associated with other account identity parameters in the identity pool.

Figure 9:
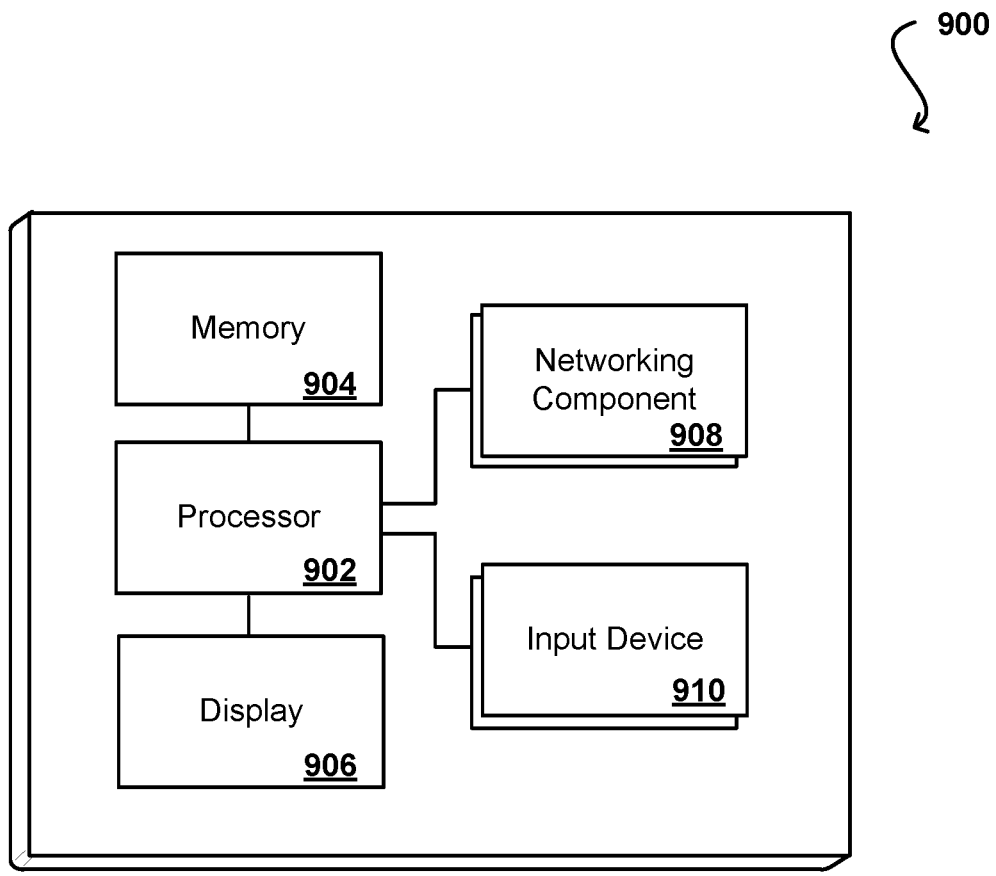
FIG. 9 illustrates a set of basic components of an example computing device that can be utilized to implement aspects of the various embodiments.

FIG. 9 illustrates a set of basic components of an example computing device 900 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device may include at least one type of display element 906, such as a touch screen, electronic ink (e-ink), organic light emitting diode (OLED) or liquid crystal display (LCD), although devices such as servers might convey information via other means, such as through a system of lights and data transmissions. The device typically will include one or more networking components 908, such as a port, network interface card, or wireless transceiver that enables communication over at least one network. The device can include at least one input device 910 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, at a user pool within a resource provider environment, a request from a user of a client device to access a Web service, the request including a login credential;
   receiving, from the user pool that received the request from the user, the login credential at an authentication service, the authentication service hosted within the resource provider environment, wherein the user pool is separate from the authentication service;
   using a nested authentication process of the authentication service to obtain an account credential associated with the login credential from the user pool by providing the login credential along with a request for the account credential to the user pool;
   receiving the account credential from the user pool after the user pool authenticates the login credential in an authentication instance independent of the user request, the account credential associated with the login credential;
   using the nested authentication process to access an identity pool separate from the authentication service, hosted within the resource provider environment, the identity pool receiving the account credential from the authentication service, the account credential remaining within the resource provider environment;
   obtaining, by the nested authentication process using the account credential, an account identifier associated with the account credential, the account identifier associating the user with the Web service;
   associating, in a database, the login credential in the user pool with the account identifier maintained in the identity pool, the identity pool being separate from the user pool, the user pool including account information for the user; and
   issuing, to the client device, access to the Web service.

2. The computer-implemented method of claim 1, wherein the login credential comprises a username, an email address, a password, or any combination thereof.

3. The computer-implemented method of claim 2, further comprising:
   receiving a service request that includes at least one of the email address or the username; and
   using the email address or username to look up at least one account parameter, the account parameter being at least one of the email address, the username, the password, or the account identifier, and the at least one account parameter being associated with a user account in an electronic gaming environment.

4. The computer-implemented method of claim 1, further comprising:
   receiving a registration request for a user account from the client device that includes the login credential;
   storing the login credential in the user pool;
   generating the account identifier, the account identifier uniquely associated with the user account; and
   storing the account identifier in the identity pool.

5. A system, comprising:
   at least one processor; and
   memory storing instructions that, when executed by the at least one processor, cause the system to:
   run an account mapping protocol, the account mapping protocol causing the system to:

obtain, from a user pool hosted within a resource provider environment, a login credential that the user pool received in a login request from a user of a client device, the user pool containing account user information;

authenticate, using a separate authentication service within the resource provider environment, the login credential, wherein the login credential is authenticated by providing the login credential to the user pool along with a request for an account credential associated with the login credential;

receive the account credential from the user pool after the user pool authenticates the login credential as an authentication instance independent of the login request received from the user, the account credential associated with the login credential;

send, to an identity pool hosted within the resource provider environment, the account credential, the account credential remaining within the resource provider environment;

obtain an account identifier associated with the account credential from the identity pool, the account identifier belonging to the identity pool, the identity pool being separate from the user pool, the identity pool containing account identity information for associating the account user information with the resource provider environment; and associate the login credential with the account identifier in a searchable data structure.

6. The system of claim 5, wherein the instructions when executed further cause the system to:
receive the login request and the login credentials from a client device;
run the account mapping protocol, thereby obtaining the account credentials; and
provide the account credentials to the client device.

7. The system of claim 5, wherein the instructions when executed further cause the system to:
run the account mapping protocol upon: detecting a registration event, detecting a sign-in event, receiving a request from an authorized client machine, or a trigger event based on a predetermined schedule.

8. The system of claim 5, wherein the searchable data structure comprises at least one of: an array, a table, a tree, a list, or a heap.

9. The system of claim 5, wherein the instructions when executed further cause the system to:
receive a query comprising a known account parameter, the known account parameter being an account user parameter belonging to the user pool or an account identity parameter belonging to the identity pool;
access the searchable data structure; and
return, in response to the query, the account user information, account identity information, or both, associated with the known account parameter.

10. The system of claim 5, wherein the instructions when executed further cause the system to:
receive a registration request for a user account that includes the login credentials, the login credentials uniquely associated with the user account;
store the login credentials in the user pool;
generate the account identifier, the account identifier uniquely associated with the user account; and
store the account identifier in the identity pool.

11. The system of claim 5, wherein the instructions when executed further cause the system to:

associate the account user information with the account identity information in the searchable data structure.

12. The system of claim 5, wherein authentication of the login credentials and receipt of the account credential occur within a secure environment.

13. The system of claim 5, wherein the instructions when executed further cause the system to:
select at least one resource to run the account mapping protocol, the account mapping protocol comprising a plurality of computing tasks, and
allocate the at least one resource for a period of time or dynamically to perform each computing task.

14. The system of claim 5, wherein the login credential and account identifier are associated with a user account in a software application environment.

15. The system of claim 14, wherein the software application environment is an electronic game.

16. A computer-implemented method, comprising:
running an account mapping protocol, the account mapping protocol comprising:
obtaining, from a user pool hosted within a resource provider environment, a login credential that the user pool received in a login request from a user of a client device, the user pool containing account user information;
authenticating, using a separate authentication service within the resource provider environment, the login credential, wherein the login credential is authenticated by providing the login credential to the user pool along with a request for an account credential associated with the login credential;
receiving the account credential from the user pool after the user pool authenticates the login credential as an authentication instance independent of the login request received from the user, the account credential associated with the login credential;
sending, to an identity pool hosted within the resource provider environment, the account credential, the account credential remaining within the resource provider environment;
obtaining an account identifier associated with the account credential from the identity pool, the account identifier belonging to the identity pool, the identity pool being separate from the user pool, the identity pool containing account identity information for associating the account user information with the resource provider environment; and
associating the login credential with the account identifier in a searchable data structure.

17. The computer-implemented method of claim 16, further comprising:
receiving a query comprising a known account parameter, the known account parameter being a parameter within the account user information or account identity information;
accessing the searchable data structure; and
returning, in response to the query, the account user information, account identity information, or both, associated with the known account parameter.

18. The computer-implemented method of claim 16, further comprising:
running the account mapping protocol upon: detecting a registration event, detecting a sign-in event, receiving a request from an authorized client machine, or a trigger event based on a predetermined schedule.

19. The computer-implemented method of claim 16, further comprising:

receiving the login request and the login credentials from a client device;

running the account mapping protocol, thereby obtaining the account credentials; and providing the account credentials to the client device.

20. The computer-implemented method of claim 16, further comprising:

receiving a registration request for a user account that includes the login credentials, the login credentials uniquely associated with the user account;

storing the login credentials in the user pool;

generating the account identifier, the account identifier uniquely associated with the user account; and storing the login credentials in the identity pool.

* * * * *